United States Patent
Nakasone

(10) Patent No.: US 10,338,622 B2
(45) Date of Patent: Jul. 2, 2019

(54) POWER ADJUSTMENT DEVICE, POWER ADJUSTMENT METHOD, POWER ADJUSTMENT SYSTEM, POWER STORAGE DEVICE, SERVER, PROGRAM

(71) Applicant: PANASONIC CORPORATION, Osaka (JP)

(72) Inventor: Haruka Nakasone, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 345 days.

(21) Appl. No.: 14/901,007

(22) PCT Filed: Jun. 19, 2014

(86) PCT No.: PCT/JP2014/003284
§ 371 (c)(1),
(2) Date: Dec. 22, 2015

(87) PCT Pub. No.: WO2014/208059
PCT Pub. Date: Dec. 31, 2014

(65) Prior Publication Data
US 2016/0209857 A1    Jul. 21, 2016

(30) Foreign Application Priority Data

Jun. 27, 2013  (JP) ................................ 2013-135331

(51) Int. Cl.
| | | |
|---|---|---|
| G05F 1/66 | (2006.01) | |
| H02J 3/32 | (2006.01) | |
| H02J 3/46 | (2006.01) | |
| H02J 7/35 | (2006.01) | |
| H02J 3/38 | (2006.01) | |
| G05B 15/02 | (2006.01) | |
| H02J 7/00 | (2006.01) | |

(52) U.S. Cl.
CPC .............. *G05F 1/66* (2013.01); *G05B 15/02* (2013.01); *H02J 3/32* (2013.01); *H02J 3/383* (2013.01);
(Continued)

(58) Field of Classification Search
CPC .......... G05F 1/66; G05B 15/02; H02J 7/0068; H02J 3/383; H02J 3/46; H02J 7/35;
(Continued)

(56) References Cited

U.S. PATENT DOCUMENTS

2003/0047209 A1* 3/2003 Yanai ...................... H02J 3/32
                                                            136/244
2004/0254899 A1* 12/2004 Abe ...................... G06Q 10/06
                                                            705/412

(Continued)

FOREIGN PATENT DOCUMENTS

| JP | 2006-288014 A | 10/2006 |
|---|---|---|
| JP | 2008-141918 A | 6/2008 |

(Continued)

OTHER PUBLICATIONS

International Search Report issued in International Application No. PCT/JP2014/003284 dated Jul. 29, 2014, with English translation.

(Continued)

*Primary Examiner* — Kenneth M Lo
*Assistant Examiner* — David J Wynne
(74) *Attorney, Agent, or Firm* — McDermott Will & Emery LLP

(57) ABSTRACT

A power adjustment device supplies power received from a power grid and power of a storage battery to an electric load in a consumer's facility. Power adjustment device includes a prediction portion, a planning portion, and a controller. Prediction portion obtains a prediction value of demand power that is power to be consumed in the electric load in a planning period, the planning period being a period in which the storage battery is charged and discharges. Planning portion determines a control content of charging of and discharging by the storage battery in the planning period depending on the prediction value of the demand power to (Continued)

minimize any one of an amount of power to be received from the power grid, a compensation for power to be received from the power grid, and an emission amount of carbon dioxide. Controller controls the power conditioner in accordance with the control content.

11 Claims, 4 Drawing Sheets

(52) U.S. Cl.
CPC ............. *H02J 3/46* (2013.01); *H02J 7/0068* (2013.01); *H02J 7/35* (2013.01); *Y02E 10/563* (2013.01); *Y02E 10/566* (2013.01); *Y02E 70/30* (2013.01)

(58) Field of Classification Search
CPC .......... H02J 3/32; Y02E 70/30; Y02E 10/563; Y02E 10/566
See application file for complete search history.

(56) References Cited

U.S. PATENT DOCUMENTS

| | | | | |
|---|---|---|---|---|
| 2010/0082172 A1* | 4/2010 | Ko | ................ | G06Q 30/02 700/291 |
| 2012/0277923 A1* | 11/2012 | Tsuchiya | ............ | B60L 11/1862 700/291 |
| 2012/0323386 A1 | 12/2012 | Ito | | |
| 2013/0024035 A1* | 1/2013 | Ito | ............... | B60L 3/12 700/291 |
| 2013/0184886 A1 | 7/2013 | Pollack et al. | | |
| 2013/0325197 A1* | 12/2013 | Mansfield | ................ | H02J 3/32 700/291 |
| 2013/0325198 A1* | 12/2013 | Mansfield | ................ | H02J 3/32 700/291 |

FOREIGN PATENT DOCUMENTS

| | | |
|---|---|---|
| JP | 2009-284586 A | 12/2009 |
| JP | 2010-233362 A | 10/2010 |
| JP | 2011-130618 A | 6/2011 |
| JP | 2012-115003 A | 6/2012 |
| JP | 2012-191736 A | 10/2012 |
| JP | 2012-222860 A | 11/2012 |
| JP | 2013-027214 A | 2/2013 |
| WO | 2012/050075 A1 | 4/2012 |

OTHER PUBLICATIONS

Extended European Search Report issued in Application No. 14817874.2 dated Mar. 22, 2016.

* cited by examiner

POWER ADJUSTMENT DEVICE, POWER ADJUSTMENT METHOD, POWER ADJUSTMENT SYSTEM, POWER STORAGE DEVICE, SERVER, PROGRAM

RELATED APPLICATIONS

This application is the U.S. National Phase under 35 U.S.C. § 371 of International Application No. PCT/JP2014/003284, filed on Jun. 19, 2014, which in turn claims the benefit of Japanese Application No. 2013-135331, filed on Jun. 27, 2013, the disclosures of which are incorporated by reference herein.

TECHNICAL FIELD

This invention relates to a power adjustment device, a power adjustment method, a power adjustment system, a power storage device, a server, and a program for selectively supplying power received from a power grid and power of a power storage apparatus to an electric load in a consumer's facility.

BACKGROUND ART

Power received from a power grid is generally used as power that is to be supplied to an electric load in a consumer's facility. In recent years, it has been proposed that power of a power storage apparatus provided in the consumer's facility is also used.

For example, a technology has been proposed (Document 1: JP 2012-191736A) in which a charging/discharging plan of a battery (storage battery), installed in an electric vehicle, that is controlled by a charging/discharging controller is created based on a home power demand prediction, an electric vehicle usage plan, and the like. A solar power generator is also used in the technology described in Document 1. A prediction value of a power demand, a prediction value of a power generation amount of the solar power generator, and the electric vehicle usage plan are used to create the charging/discharging plan.

The charging/discharging plan is created such that the battery is charged with late-night power in the middle of the night, power is supplied from the battery early in the morning, and power discharged from the battery decreases as an amount of power generated by the solar power generator increases. Furthermore, the charging/discharging plan is created such that the battery is not charged in the case where the electric vehicle is not present, and when the electric vehicle is connected in the evening, the battery discharges in accordance with an increase in the demand of the electric load (load).

Also, a technology (Document 2: JP 2010-233362A, for example) is proposed in which, using a storage battery for storing power to be used for a building and a power supply control means, charging of and discharging by the storage battery is controlled such that power is economically supplied to the building. A solar power generator is also used in the technology described in Document 2. In the technology described in Document 2, a charging/discharging schedule of the storage battery is created so that power is economically supplied to the building.

The charging/discharging schedule of the storage battery is created so as to be the most economical based on predictions with respect to an amount of power to be supplied from a distribution board, an amount of power to be generated by the solar power generator, an amount of power to be supplied from the solar power generator or the power storage device to a power provider, and the like. Also, Document 2 discloses creating the charging/discharging schedule by acquiring information of a unit price for purchasing power and a unit price for selling power and considering the information acquired in order to take economic efficiency into consideration.

In the technologies described in Documents 1 and 2, the charging/discharging schedule of a storage battery is created in units of days. That is, control of charging of and discharging by the storage battery is performed in a fixed period, namely a day. That is, a configuration is adopted in which the object is to achieve a reduction in the amount of power to be received from the power grid or the compensation for the power to be received from the power grid in a fixed period, namely a day.

On the other hand, there are cases in which the object cannot be sufficiently achieved in a schedule created in units of days such as a case in which the amount of power consumed in an electric load greatly changes day by day, or a case in which the amount of power to be received from the power grid is required to be reduced in a specific period due to a demand response.

SUMMARY OF INVENTION

An object of the present invention is to provide a power adjustment device, a power adjustment method, a power adjustment system, a power storage device, a server, and a program for adjusting control of charging of or discharging by a power storage apparatus in order to minimize any of an amount of power to be received from a power grid, a compensation for power to be received from a power grid, and an emission amount of carbon dioxide.

A power adjustment device according to the present invention is configured to supply power received from a power grid and power of a power storage apparatus to an electric load in a consumer's facility. The power adjustment device includes: a prediction portion configured to obtain a prediction value of demand power that is power to be consumed in the electric load in a planning period, the planning period being a period in which the power storage apparatus is charged and discharges; a planning portion configured to determine a control content of charging of and discharging by the power storage apparatus in the planning period depending on the prediction value of the demand power under a condition that any one of an amount of power to be received from the power grid, a compensation for power to be received from the power grid, and an emission amount of carbon dioxide is minimized; and a controller configured to control the power storage apparatus in accordance with the control content.

A power adjustment method according to the present invention is for supplying power received from a power grid and power of a power storage apparatus to an electric load in a consumer's facility. The power adjustment method includes: obtaining, with a prediction portion, a prediction value of demand power that is power to be consumed in the electric load in a planning period, the planning period being a period in which the power storage apparatus is charged and discharges; determining, with a planning portion, a control content of charging of and discharging by the power storage apparatus in the planning period depending on the prediction value of the demand power under a condition that any one of an amount of power to be received from the power grid, a compensation for power to be received from the power grid, and an emission amount of carbon dioxide is minimized; and controlling, with a controller, the power storage apparatus in accordance with the control content.

A power adjustment system according to the present invention includes: the power adjustment device described above; and the power storage apparatus.

A power storage device according to the present invention includes: the power adjustment device described above; the power storage apparatus; and a housing that houses the power adjustment device and the power storage apparatus.

A server according to the present invention is configured to communicate with a control device configured to control a power storage apparatus such that power received from a power grid and power of the power storage apparatus is supplied to an electric load in a consumer's facility. The server includes: a prediction portion configured to obtain a prediction value of demand power that is power to be consumed in the electric load in a planning period, the planning period being a period in which the power storage apparatus is charged and discharges; a planning portion configured to determine a control content of charging of and discharging by the power storage apparatus in the planning period depending on the prediction value of the demand power under a condition that any one of an amount of power to be received from the power grid, a compensation for power to be received from the power grid, and an emission amount of carbon dioxide is minimized; and a communication portion configured to notify the control device of the control content such that the power storage apparatus is caused to operate in accordance with the control content.

A program according to the present invention causes a computer to function as the power adjustment device described above.

DESCRIPTION OF EMBODIMENTS

Figure 1:
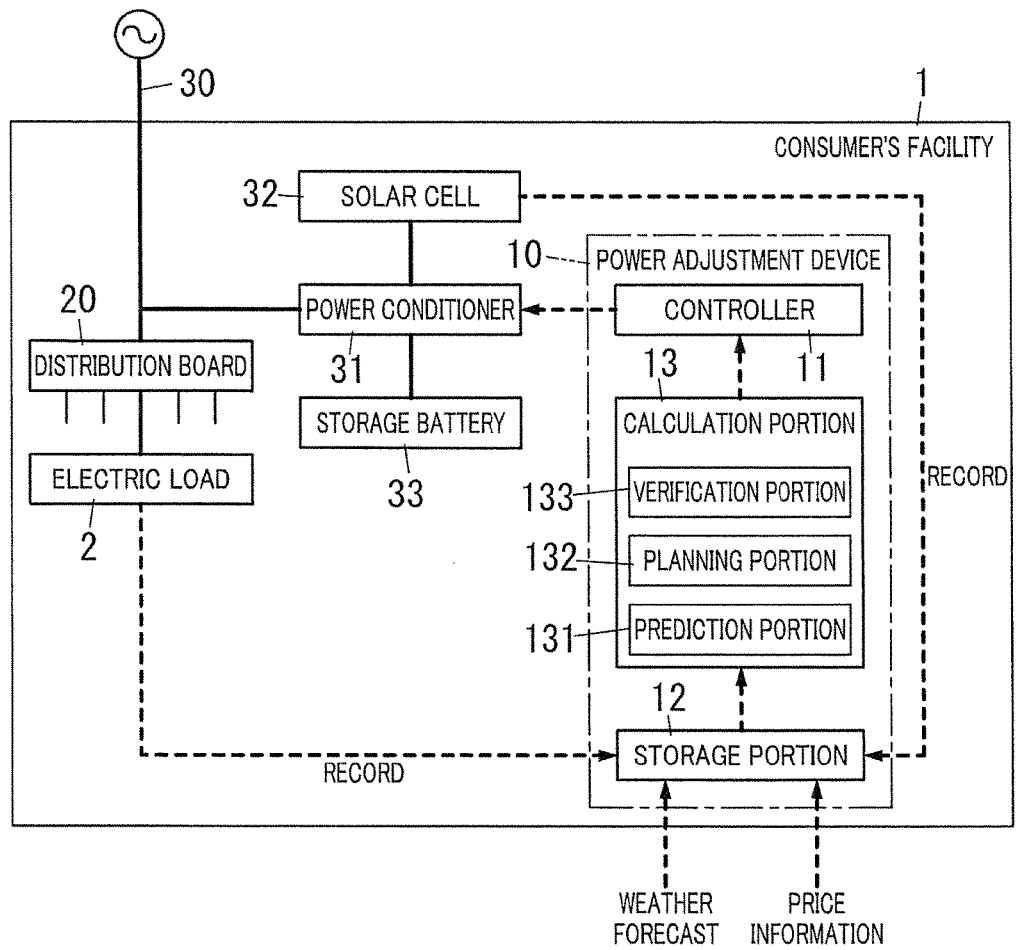
FIG. 1 is a block diagram illustrating Embodiments 1 to 3.

As shown in FIG. 1, a power adjustment device 10 to be described hereinafter has a function of supplying power received from a power grid 30 and power of a power storage apparatus (storage battery 33) to an electric load 2 in a consumer's facility 1. The power adjustment device 10 includes a prediction portion 131, a planning portion 132, and a controller 11. The prediction portion 131 obtains a prediction value of demand power that is the power to be consumed in the electric load 2 in a planning period, the planning period being a period in which the power storage apparatus (storage battery 33) charged and discharges. The planning portion 132 determines, under a specific condition, a control content of charging of and discharging by the power storage apparatus (storage battery 33) in the planning period depending on the prediction value of the demand power. Here, the specific condition is that any one of the power amount to be received from the power grid 30, the compensation for power to be received from the power grid 30, and the emission amount of carbon dioxide is minimized. The controller 11 controls a power storage apparatus (power conditioner 31) in accordance with the control content.

In the case where two or more unit prices are set for two or more periods as the compensation for power to be received from the power grid 30, the planning period is preferably set to start at a starting time of a period in which a unit price is the lowest. Also, the planning period is preferably set to include two or more periods such that unit prices in the two or more periods, of the two or more unit prices, are respectively different.

A solar power generation apparatus (solar cell 32) may be installed in the consumer's facility 1. In this case, the prediction portion 131 is configured to obtain a prediction value of generated power that is power generated by the solar power generation apparatus (solar cell 32) in the planning period. The planning period is set to include a period in which the prediction value of the generated power is more than a predetermined threshold and a period in which the prediction value of the generated power is less than the predetermined threshold.

Also, in the case where the solar power generation apparatus (solar cell 32) is installed in the consumer's facility 1, the power storage apparatus (storage battery 33) may be charged with surplus power that is obtained by subtracting the demand power from generated power that is the power generated by the solar power generation apparatus (solar cell 32). In this case, the prediction portion 131 is configured to obtain a prediction value of the generated power in the planning period, and obtain a prediction value of the surplus power from the prediction value of the generated power and the prediction value of the demand power. The planning period is set to include a period in which the power storage apparatus (storage battery 33) can be charged with the surplus power that is predicted, and a period in which the power storage apparatus (storage battery 33) cannot be charged with the surplus power that is predicted.

The power adjustment device 10 may further include a verification portion 133. The verification portion 133 is configured to estimate a prediction error of the prediction value obtained by the prediction portion 131. In this case, the prediction portion 131 preferably determines the planning period using a worst condition assumed from the prediction error.

Also, the prediction portion 131 preferably determines two or more planning periods in which part of one of the two or more planning periods overlaps with part of another of the two or more planning periods, and obtains a prediction value for each of the two or more planning periods.

It is preferable that, in the power adjustment device, the planning period be set as a period including multiple calculation time periods, each of which serves as a unit period, and the planning portion 132 determine the control content such that the power storage apparatus (storage battery 33) is charged or discharges for each of the calculation time periods.

A power adjustment method to be described hereinafter is for supplying power received from the power grid 30 and power of the power storage apparatus (storage battery 33) to the electric load 2 in the consumer's facility 1. In the power adjustment method, the prediction portion 131 obtains a prediction value of demand power that is power to be consumed in the electric load 2 in a planning period, the planning period being a period in which the power storage apparatus (storage battery 33) is charged and discharges. Furthermore, the planning portion 132 determines, under the specific condition described above, a control content of charging of and discharging by the power storage apparatus (storage battery 33) in the planning period depending on the prediction value of the demand power. The controller 11 controls the power storage apparatus (power conditioner 31) in accordance with the control content.

A solar power generation apparatus is described in Embodiments 1 to 3 to be described hereinafter, however, the solar power generation apparatus may be omitted in an exemplary configuration described in Embodiments 1 to 3. That is, the technology described in Embodiments 1 to 3 can be also applied to a consumer's facility that includes only a power storage apparatus.

(Embodiment 1)

Hereinafter, an embodiment will be described in detail. The consumer's facility 1 includes a distribution board 20 that receives power from the power grid 30, as shown in FIG. 1. The power conditioner 31 is connected on a primary side of the distribution board 20. The electric load 2 is connected on a secondary side of the distribution board 20. The distribution board 20 includes therein a main breaker (not shown) that is an electrical leakage breaker and a plurality of branch breakers (not shown) that cause a main circuit passing through the main breaker to branch into a plurality of branch circuits. The primary side of the distribution board 20 refers to an electric path through which the main breaker receives power from the power grid 30, and the secondary side of the distribution board 20 refers to branched electric paths from the branch breakers. Note that, in FIG. 1, solid lines indicate wiring for power, and broken lines indicate paths for a signal or information.

The solar cell 32 and the storage battery 33 are connected to the power conditioner 31. The solar cell 32 and the power conditioner 31 constitutes the solar power generation apparatus, and the storage battery 33 and the power conditioner 31 constitutes the power storage apparatus.

That is to say, the power conditioner 31 has a function of converting a DC voltage outputted from the solar cell 32 into an AC voltage, and a function of charging of and discharging by the storage battery 33. Accordingly, the power conditioner 31 is configured to convert the DC voltage outputted from the solar cell 32 and the DC voltage outputted from the storage battery 33 into an AC voltage equivalent to the AC voltage that is received from the power grid 30.

Also, the storage battery 33 is charged with at least one of the power supplied from the power grid 30 and the power supplied from the solar cell 32. A configuration can be adopted in which the power conditioner 31 charges the storage battery 33 with the DC voltage outputted from the solar cell 32. A configuration may be adopted in which the power conditioner 31 converts the DC voltage outputted from the solar cell 32 to an AC voltage, and then converts the AC voltage to a DC voltage to charge the storage battery 33. The power conditioner 31 further has a function of converting an AC voltage received from the power grid 30 into a DC voltage and charging the storage battery 33 with the DC voltage.

The solar power generation apparatus and the power storage apparatus constitute a power adjustment system by being combined with the power adjustment device 10. That is, the power adjustment system includes the power adjustment device 10, and the power storage apparatus (power conditioner 31 and storage battery 33). Here, the power adjustment system further includes the solar cell 32. Note that, as described above, the solar cell 32 can be omitted.

The power adjustment device 10 includes, as a main hardware element, a device that includes a processor configured to operate according to a program. That is, the program causes the computer to function as the power adjustment device 10. A microcontroller that includes a memory integrally with a processor, a processor that needs a separate memory, or the like is used as this type of device. The program is written into a ROM (Read Only Memory) that is implemented as hardware along with a processor. Alternatively, the program may be acquired through a telecommunications line such as the Internet, or be loaded into from a computer-readable storage medium (storage medium that records a program).

Incidentally, the power adjustment device 10 adjusts periods in which the storage battery 33 is charged or discharges and the power with which the storage battery 33 is charged or discharges in order to minimize the compensation to be paid for the power received from the power grid 30 (electricity buying) in the planning period to be determined in a manner described later. Accordingly, the power adjustment device 10 includes the controller 11 configured to control the power conditioner 31 that performs charging of and discharging by the storage battery 33. The control content of the power conditioner 31 by the controller 11 will be described later.

Figure 2:
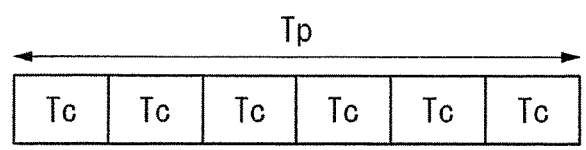
FIG. 2 is a diagram illustrating operations of Embodiment 1.

The condition for controlling the charging of and discharging by the storage battery 33 (power storage apparatus) includes a unit price (compensation per 1 kWh) for electricity buying and electricity selling in the planning period. The planning period is set such that the unit price for electricity buying and electricity selling changes in the planning period. Also, the planning period is set as a period having a length of an integral multiple of the calculation time period serving as a unit period. That is, as shown in FIG. 2, a planning period Tp includes a plurality of (six of, for example) calculation time periods Tc. Either charging of or discharging by the storage battery 33 is selectively performed in each of the calculation time periods Tc.

Figure 3:
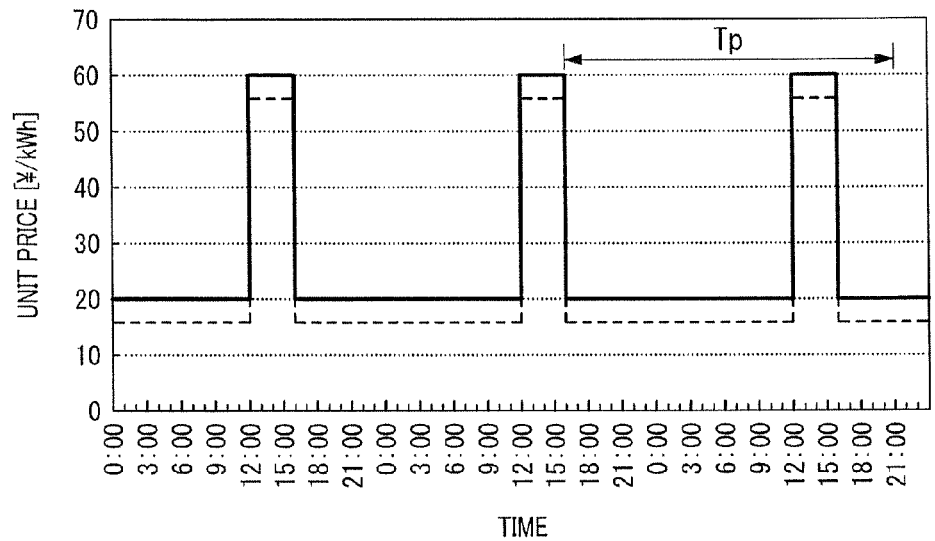
FIG. 3 is a diagram illustrating a change in unit prices for electricity selling and electricity buying in Embodiment 1.

In FIG. 3, a case is shown in which the unit price (solid line) for electricity buying is ¥60/kWh in a period from 12:00 to 16:00 in one day and the unit price for electricity buying is ¥20/kWh in the other time slots in the day, as an example. Also, the unit price (broken line) for electricity selling is linked to the unit price for electricity buying, and the unit price for electricity selling is ¥56/kWh in a period from 12:00 to 16:00 in one day and the unit price for electricity selling is ¥16/kWh in the other time slots in the one day. In this example, the period from 21:00 to 21:00 of the next day can be set as the planning period Tp, since the unit price changes during the period. The period from 18:00 to the following 10:00 cannot be set as the planning period since the unit price does not change.

Since the unit price for electricity buying and electricity selling changes depending on the date and time, as described in the example above, information regarding the unit price that corresponds to the date and time (hereinafter, the information of the unit price for electricity buying and electricity selling is referred to as "price information") needs to be acquired. Also, the condition for controlling the power storage apparatus includes information on the power (generated power) that is to be generated by the solar cell 32 (solar power generation apparatus) and the power (demand power) that is to be consumed in the electric load 2. Because the power to be generated by the solar power generation apparatus is dependent on the sunlight, at the least weather forecast information is used in the prediction of power generation.

Note that a calculation including the unit price for electricity selling will not be described in the present embodiment. In this calculation, loss due to the electricity buying and a gain due to the electricity selling are considered, and the control content of charging of and discharging by the storage battery 33 is determined such that maximum profit (=income−loss) is obtained. A known method may be adopted as the method of the calculation.

The power adjustment device 10 includes a storage portion 12 configured to store the above condition for controlling charging of and discharging by the power storage apparatus. The storage portion 12 is configured to, at a point in time before the planning period, store information of a record (history) of the generated power and the demand power in a period prior to the point in time, and furthermore to store price information in the planning period, weather forecast information in the planning period, and the like. Note that the price information and the weather forecast information may be acquired at a timing when the information becomes necessary. The information about the record of generated power and demand power is information in which a power amount for each fixed time unit (selected from 10 minutes, 30 minutes, one hour, and the like, for example) is associated with the date and time. That is, in this specification, the generated power and the demand power may refer to not only the instantaneous power but also a power amount per time unit. Also, the information about the record of generated power and demand power is associated with past weather information (weather forecast information) including weather, temperature, and the like. An example of the information that is stored in the storage portion 12 is shown in Table 1.

TABLE 1

| Date and time | Demand power [W] | Generated power [W] | Weather forecast | Unit price for electricity buying [¥/kWh] | Unit price for electricity selling [¥/kWh] |
| --- | --- | --- | --- | --- | --- |
| 7/1 0:00 | 350 | 0 | Fine | 10 | 30 |
| 7/1 1:00 | 380 | 0 | Fine | 10 | 30 |
| 7/1 2:00 | 350 | 0 | Fine | 10 | 30 |
| 7/1 3:00 | 370 | 0 | Fine | 10 | 30 |
| 7/1 4:00 | 320 | 0 | Fine | 10 | 30 |
| 7/1 5:00 | 390 | 10 | Fine | 10 | 30 |
| 7/1 6:00 | 500 | 200 | Fine | 20 | 30 |
| 7/1 7:00 | 540 | 430 | Fine | 20 | 30 |
| . | . | . | . | . | . |
| . | . | . | . | . | . |
| . | . | . | . | . | . |

The power adjustment device 10 includes: a calculation portion 13. The calculation portion 13 includes the prediction portion 131 configured to predict demand power and generated power in the planning period; and the planning portion 132 configured to determine the control content of charging of and discharging by the storage battery 33 in the planning period.

The prediction portion 131 uses the information about the record of demand power stored in the storage portion 12 in order to predict the demand power in the planning period. Also, the prediction portion 131 uses the weather forecast information in the planning period and the information about the record of generated power stored in the storage portion 12 in order to predict the generated power in the planning period. That is, the prediction portion 131 is configured to predict the demand power in the planning period from the record of demand power, and furthermore predict the generated power in the planning period from the weather forecast information and the record of generated power. The weather forecast information may be acquired from an external device (server) through a telecommunications line such as the Internet.

Here, with respect to the demand power in the planning period, a period whose conditions (such as season, time slot, weather, and temperature) are similar to those of the planning period is extracted from the past record, and the record of demand power in the extracted period is inferred to be the demand power in the planning period. The conditions need not to be completely matched, and in the case where the similarity between the conditions can be evaluated to be within a similarity range, the corresponding demand power is used as the prediction result. Two or more periods whose conditions are within the similarity range may be obtained. In the case where two or more periods are obtained, the change patterns of demand power are averaged (for example, average value or median value in each time period is used in the corresponding time period), and the obtained change pattern of demand power is predicted as the demand power in the planning period.

With respect to the generated power in the planning period, a period whose conditions including at least the weather forecast information are similar to those of the planning period is extracted from the past record, and the record of generated power in the extracted period is inferred to be the generated power in the planning period. Here, similarly to the case of the demand power, the conditions need not to be completely matched, and in the case where the similarity between the conditions can be evaluated to be within a similarity range, the corresponding generated power is used as the prediction result.

A method in which the past records are classified into clusters may be used as an example of the method for predicting the demand power. In the case where this method is adopted, the prediction portion 131 classifies the past records (change patterns) in a time slot that is the same as the planning period into clusters by evaluating the degree of similarity. The clusters may possibly include information for a plurality of days. In the case where the information for a plurality of days is included, the change pattern of demand power is averaged as described above, and the averaged change pattern of demand power is predicted as the demand power in the planning period.

The planning portion 132 is configured to create a plan of charging of and discharging by the storage battery 33 in the planning period using the demand power and the generated power predicted by the prediction portion 131 and the price information. That is, the planning portion 132 is configured to determine the control content of charging of and discharging by the storage battery 33 in the planning period. The control content that is created by the planning portion 132 is determined under the constraint condition that the amount of power to be received from the power grid 30, the compensation for power to be received from the power grid 30, or the emission amount of carbon dioxide is minimized. Hereinafter, a case in which the compensation is minimized will be illustrated.

That is to say, the control content of charging of and discharging by the storage battery 33 in the planning period is determined under the condition that the compensation for the power to be received from the power grid 30 is minimized. Accordingly, in the case where two or more levels of unit prices are set for electricity buying, it is desirable to perform discharging of the storage battery 33 in a period in which the unit price for electricity buying is the highest in order to reduce the amount of power to be received from the power grid 30. Also, the storage battery 33 is desirably charged in the other periods in order to enable the discharging of the storage battery 33 in the period in which the unit price for electricity buying is the highest.

In order to perform the charging of and discharging by the storage battery 33 as described above, the start point of the planning period is desirably set within a predetermined period from the start of the period in which the unit price for electricity buying is the lowest. That is, in the planning period, a time period to charge the storage battery 33 is secured before the period in which the unit price for electricity buying is the highest starts. On the other hand, the end point of the planning period is determined to be a point of time when the period in which the unit price for electricity buying is the highest ends.

In order to achieve the above described object (object of minimizing compensation), it is most desirable that the starting time of the planning period is set to the starting time of the period in which the unit price for electricity buying is the lowest. For example, when two levels of unit prices for electricity buying are set as described above and the period in which the unit price for electricity buying is high is a period from 12:00 to 16:00, the starting time of the planning period becomes 16:00. This rule can be applied not only to the case where the unit price for electricity buying is set in two levels, but also a case where the unit price is set in three or more levels.

By setting the starting time of the planning period to the starting time of the period in which the unit price for electricity buying is the lowest, the planning period can include a period in which the unit price for electricity buying is relatively low, and it is possible to make the period before the unit price for electricity buying becomes the highest relatively long. Therefore, the power storage apparatus (storage battery 33) can be charged in the period before the unit price for electricity buying becomes the highest. In other words, the storage battery 33 can be charged before the unit price for electricity buying starts to increase, and the amount of power to be received from the power grid 30 can be reduced by performing discharging by the storage battery 33 in the period in which the unit price for electricity buying is high. That is, it contributes to the reduction in electricity bills for the consumer's facility.

Upon the calculation portion 13 determining the control content of charging of and discharging by the storage battery 33, the controller 11 provided in the power adjustment device 10 controls the power conditioner 31 such that the storage battery 33 is charged and discharges in accordance with the control content.

In the case where the storage battery 33 is charged only with power received from the power grid 30, the planning period is determined depending only on the price information. Accordingly, if periodicity exists in the price information, the planning period can be set at a fixed cycle. Note that, if periodicity does not exist in the price information, the planning period may be set appropriately according to the change in the price information. That is, because an upper limit value and a lower limit value are considered to exist in the unit price for electricity buying, the period from a point in time after a period in which the unit price for electricity buying is in the vicinity of the upper limit value ends until when a period in which the unit price for electricity buying is predicted to be in the vicinity of the upper limit value begins is set as the planning period.

As described above, the length of the planning period is not fixed, and is adjusted according to the price information, and thereby it is possible to charge the storage battery 33 with the power that is predicted to be required in a period in which the storage battery 33 discharges before the period begins.

That is to say, as will be described later, control of charging of and discharging by the storage battery 33 in the planning period can be set even if the planning period spans two days. Therefore, adjustment of power in charging and discharging can be performed more reliably compared with the case where the planning period for the control of charging of and discharging by the storage battery 33 is fixed. As a result, the object of minimizing the amount of power to be received from the power grid 30, the compensation for power to be received from the power grid 30, or the emission amount of carbon dioxide can be easily achieved.

In short, according to the configuration of the present embodiment, the prediction portion 131 determines a period in which the power storage apparatus (storage battery 33) is charged and discharges as the planning period, and obtains a prediction value of the demand power that is power to be consumed in the electric load 2 in the planning period. Furthermore, the power adjustment device 10 of the present embodiment determines the control content of charging of and discharging by the power storage apparatus (storage battery 33) in the planning period. Accordingly, the planning period in which control of charging of and discharging by the power storage apparatus (storage battery 33) is performed can be set appropriately in order to minimize one of the power amount to be received from the power grid 30, the compensation for power to be received from the power grid 30, and the emission amount of carbon dioxide.

Furthermore, compared with a case where the charging of and discharging by the storage battery 33 is controlled in units of days, the frequency of charging of and discharging by the storage battery 33 can be reduced, and deterioration of the storage battery 33 can be suppressed.

(Embodiment 2)

In Embodiment 1, the planning period is set based only on the compensation (unit price for electricity buying) for power to be received from the power grid 30. In the present embodiment, the planning period is set considering not only the unit price for electricity buying, but also compensation (unit price for electricity selling) with respect to performing a reverse power flow from a solar power generation apparatus (solar cell 32 and power conditioner 31) to the power grid 30 and the power generated by the solar power generation apparatus.

In the present embodiment, a storage battery 33 is charged with not only the power received from the power grid 30, but also the power generated by the solar cell 32. That is, in the case where the unit price for electricity buying is higher than the unit price for electricity selling and accordingly profit is not generated in the consumer's facility 1 even if the reverse power flow is performed from the solar power generation apparatus to the power grid 30, the power generated by the solar power generation apparatus is supplied to the electric load 2 or is used to charge the storage battery 33. In this case, the generated power is supplied directly or indirectly to the electric load 2, and as a result, the amount of power to be received from the power grid 30 is reduced.

Figure 4:
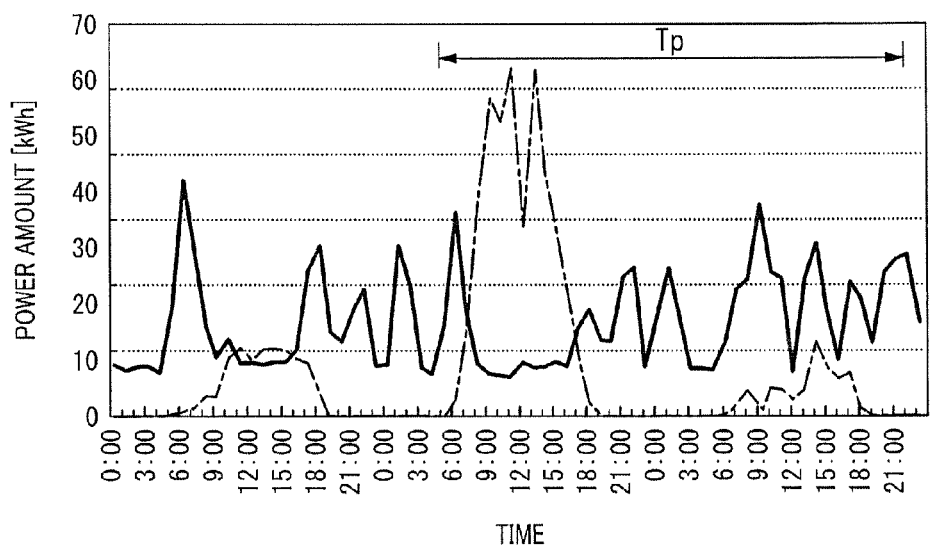
FIG. 4 is a diagram illustrating operations of Embodiment 2.

In the case where the power generated by the solar power generation apparatus is allocated to the demand power of the electric load 2 as above, the planning period is set such that a time slot in which there is a large amount of generated power and a time slot in which there is a small amount of generated power are included, as shown in FIG. 4. That is, the planning period is set such that a period in which the prediction value of generated power predicted by the prediction portion 131 exceeds a predetermined threshold (20 kWh, for example), and a period in which the prediction value of generated power predicted by the prediction portion 131 is less than the predetermined threshold are included. Here, the threshold is set such that, in the period in which the prediction value of generated power predicted by the prediction portion 131 exceeds the threshold (hereinafter referred to also as "first period"), the storage battery 33 can be charged with the generated power predicted by the prediction portion 131. Also, the threshold is set such that, in the period in which the prediction value of generated power predicted by the prediction portion 131 is less than the threshold (hereinafter referred to also as "second period"), the generated power predicted by the prediction portion 131 is not sufficient for the demand power.

Note that the threshold may be set to have some degree of width, which has a prescribed lower limit value (15 kWh, for example) and a prescribed upper limit value (25 kWh, for example). In this case, the planning period is set such that a period (first period) in which the prediction value of generated power predicted by the prediction portion 131 exceeds the upper limit value of the threshold and a period (second period) in which the prediction value of generated power predicted by the prediction portion 131 is less than the lower limit value of the threshold are included.

The illustrated example shows a change in the demand power (solid line) and the generated power (dashed-dotted line) over three days. The planning period is set to extend over two days including a day in which a large amount of power is to be generated and a day in which a small amount of power is to be generated, and the day in which a large amount of power is to be generated and the storage battery 33 can be charged with the generated power precedes the day in which a small amount of power is to be generated and the generated power is not sufficient for the demand power. That is, the planning period is set such that the first period precedes the second period.

This is for performing charging of the storage battery 33 on a day (period) in which a large amount of power is generated, and not performing electricity selling and supplying the generated power to the electric load 2 along with the power stored in the storage battery 33 in a day (period) in which a small amount of power is generated. According to the above-described control, the differences in the amount of power generated by the solar cell 32 depending on the time slot in the planning period can be absorbed by performing charging of and discharging by the storage battery 33, and as a result, the amount of power to be received from the power grid 30 can be reduced. That is, the calculation portion 13 adjusts the control content of charging of and discharging by the storage battery 33 according to the generated power, which contributes to reducing the amount of power to be received from the power grid 30.

Incidentally, the power from the generated power used for charging the storage battery 33 is, generally, equal to or less than surplus power that is obtained by subtracting the demand power from the generated power. In the case where such a restrictive condition is applied, it is possible that power for charging the storage battery 33 cannot be secured if the planning period is set considering only the generated power, as described above.

Therefore, it is more desirable that the planning period is set based on the surplus power that is obtained by subtracting the demand power from the generated power. That is, the calculation portion 13 sets the planning period such that a period in which the amount of surplus power is large and a period in which the amount of surplus power is small are included. Specifically, the prediction portion 131 determines the period in which the power storage apparatus (storage battery 33) is charged and discharges as the planning period such that a period in which the amount of surplus power is large and the amount of surplus power is small are included in the planning period. That is, the planning period is set to include a period in which the storage battery 33 can be charged with the surplus power predicted by the prediction portion 131 and a period in which the storage battery 33 cannot be charged with the surplus power predicted by the prediction portion 131. Here, the period in which the storage battery 33 cannot be charged with the surplus power predicted by the prediction portion 131 includes a period in which the prediction value of generated power predicted by the prediction portion 131 is less than the prediction value of demand power, that is, a period in which no surplus power is generated.

Accordingly, the calculation portion 13 determines the control content such that the storage battery 33 is charged in a period in which the amount of surplus power is large, and the storage battery 33 discharges in a period in which the amount of surplus power is small. The planning period is determined such that the period in which the storage battery 33 can be charged with the surplus power precedes the period in which the storage battery 33 cannot be charged with the surplus power.

As a result of determining the control content of charging of and discharging by the storage battery 33 by focusing on the surplus power, as described above, power for charging the storage battery 33 can be secured. As a result, power of the storage battery 33 can be supplied to the electric load 2 in a period in which the amount of surplus power is small or the amount of generated power is less than the demand power, and thereby the amount of power received from the power grid 30 can be further reduced.

Incidentally, in the exemplary configuration described above, demand power and generated power in the planning period are predicted. Therefore, the predicted demand power and generated power include a prediction error. Accordingly, the calculation portion 13 desirably includes the verification portion 133 configured to estimate the prediction error. The verification portion 133 is configured to verify the prediction value obtained from record values of the demand power and generated power, and estimate the prediction error of the prediction value. When estimating the prediction error, verification by simulation is performed, for example. Note that the prediction portion 131 obtains, as the prediction result, the prediction value of demand power, the prediction value of generated power, and the prediction value of surplus power. The verification portion 133 is configured to estimate the prediction error of the prediction result predicted by the prediction portion 131, and in the case where the prediction result includes the prediction value of demand power, the prediction value of generated power, and the prediction value of surplus power, the verification portion 133 estimates the prediction error of each of the prediction values.

The planning portion 132 sets the planning period using a maximum value of the demand power in which the prediction error is considered and a minimum value of the generated power in which the prediction error is considered, and determines the control content of charging of and discharging by the storage battery 33 using the demand power and generated power in which the prediction error is considered. That is, since the planning period is determined based on the assumed worst condition considering the prediction error of the demand power of the electric load 2 and the generated power of the solar cell 32, an effect in which the amount of power to be received from the power grid 30 is reduced can be expected, even if there is a prediction error. In the case where the verification portion 133 estimates the prediction error only for the prediction value of demand power, the worst condition refers to a state in which the demand power is at the minimum within a range of the prediction error. In the case where the verification portion 133 estimates the prediction error of the prediction value of demand power and the prediction value of generated power, the worst condition refers to a state in which the surplus power is at the minimum within a range of the prediction error.

Incidentally, if the planning period is lengthened, although it is possible to cancel out daily variations of the demand power and generated power, the prediction error increases as the planning period becomes longer. Therefore, in the case where the prediction values of demand power and generated power are corrected with correction values obtained by the prediction errors, the correction values may increase as the planning period becomes longer, and the prediction values of demand power and generated power may become unrealizable values as the correction values increase. Therefore, in the case where the prediction error is considered, it is desirable to limit the length of the planning period and the size of the prediction error. The other configurations and operations are the same as those of Embodiment 1.

(Embodiment 3)

Figure 5:
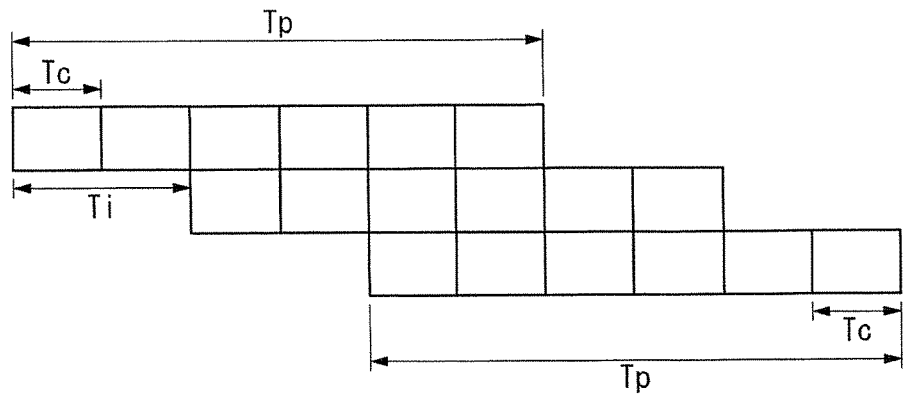
FIG. 5 is a diagram illustrating operations of Embodiment 3.

Although the planning periods are separately set one-by-one in the embodiments described above, the planning periods may be set such that portions of two or more planning periods overlap, as shown in FIG. 5. That is, with respect to two or more planning periods, the time intervals (referred to as "planning intervals") of points of time when the planning periods start are set shorter than the length of the planning periods. Denoting the length of the planning period as Tp and the planning interval as Ti, the relation Tp≤Ti holds in the above embodiments, in contrast, the relation Tp>Ti holds in the present embodiment. The planning periods are set as periods including multiple calculation time periods Tc, the calculation time period being the unit period. In the illustrated example, the planning periods each include six calculation time periods Tc, and are set to be shifted by the time period corresponding to the two calculation time periods Tc. In other words, each planning period overlaps with the previous and following planning periods in a time period corresponding to four of the calculation time periods Tc.

As described in the description of Embodiment 1, the control content to be executed in the planning period is determined by the calculation portion 13 before the planning period starts. Therefore, even if the condition used in determining the control content in the planning period is changed after the planning period starts, the change cannot be dealt with in the configuration of Embodiment 1.

In contrast, in the present embodiment, since a portion of the planning periods overlap, in the case where the condition used in determining the control content is changed after the planning period starts, the control content in the next planning period can be changed. That is, the control content can be changed quickly in response to the change in the condition. For example, even in the case where the unit price for electricity buying is changed due to the demand response from an electric power provider after the planning period starts, the control content can be changed in the midst of the current planning period. In this case, the control content after change is executed in the planning period after the control content is changed. That is, the plan of charging of and discharging by the storage battery 33 can be changed according to a demand response, and as a result the amount of power to be received from the power grid 30 can be reduced.

In the exemplary configuration described above, the calculation time period Tc is set to one hour as an example. If the calculation time period Tc is shortened, opportunities to select between charging of and discharging by the storage battery 33 increase, and as a result fine control can be performed. For example, if the calculation time period Tc is changed from one hour to 30 minutes, even in a case where the generated power or the demand power has changed suddenly, control to follow the change such that the amount of power to be received from the power grid 30 is reduced by charging of or discharging by the storage battery 33 can be performed. In particular, in the case where portions of the planning periods overlap as in the present embodiment, followability with respect to the change in conditions increases as the calculation time period Tc decreases.

Note that, in Embodiments 1 to 3 described above, although a solar power generation apparatus including a solar cell 32 is illustrated as an example, a power generation apparatus that generates power using other natural energy such as a wind power generation apparatus or a geothermal power generation apparatus can be used instead of the solar power generator. Also, the power storage apparatus may be configured such that a storage battery installed in an electric vehicle and a control device that controls charging of and discharging by the storage battery are combined, other than a dedicated device including a storage battery.

Figure 6:
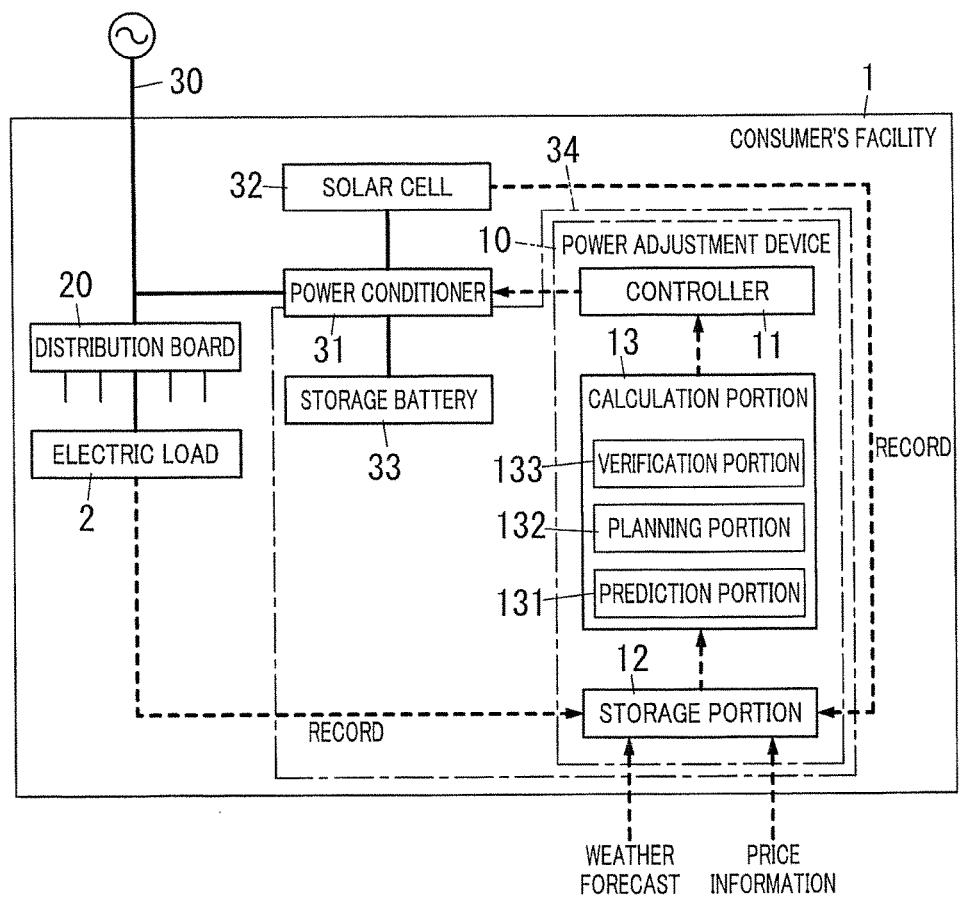
FIG. 6 is a block diagram illustrating another exemplary configuration of Embodiments 1 to 3.

The power adjustment device 10 described above may constitute an independent device, or, be incorporated into a controller used for a HEMS (Home Energy Management System). The HEMS controller refers to a device that has a function of managing (monitoring and controlling) the operating state of the electric load 2 by communicating with the electric load 2. Also, the power adjustment device 10 may be housed in a housing 34 same as that for the power storage apparatus (storage battery 33) so as to configure a power storage device, as shown in FIG. 6. That is, the power adjustment device 10 is housed in the housing 34 of a power storage apparatus so as to constitute a power storage device that includes the power adjustment device 10, a power storage apparatus (storage battery 33), and the housing 34 for housing the power adjustment device 10 and the power storage apparatus (storage battery 33). Although a case where a portion of the power conditioner 31 performing charging of and discharging by the storage battery 33 is housed in the housing 34 of the power storage apparatus is illustrated in FIG. 6, the housing 34 may be separated from the power conditioner 31.

Figure 7:
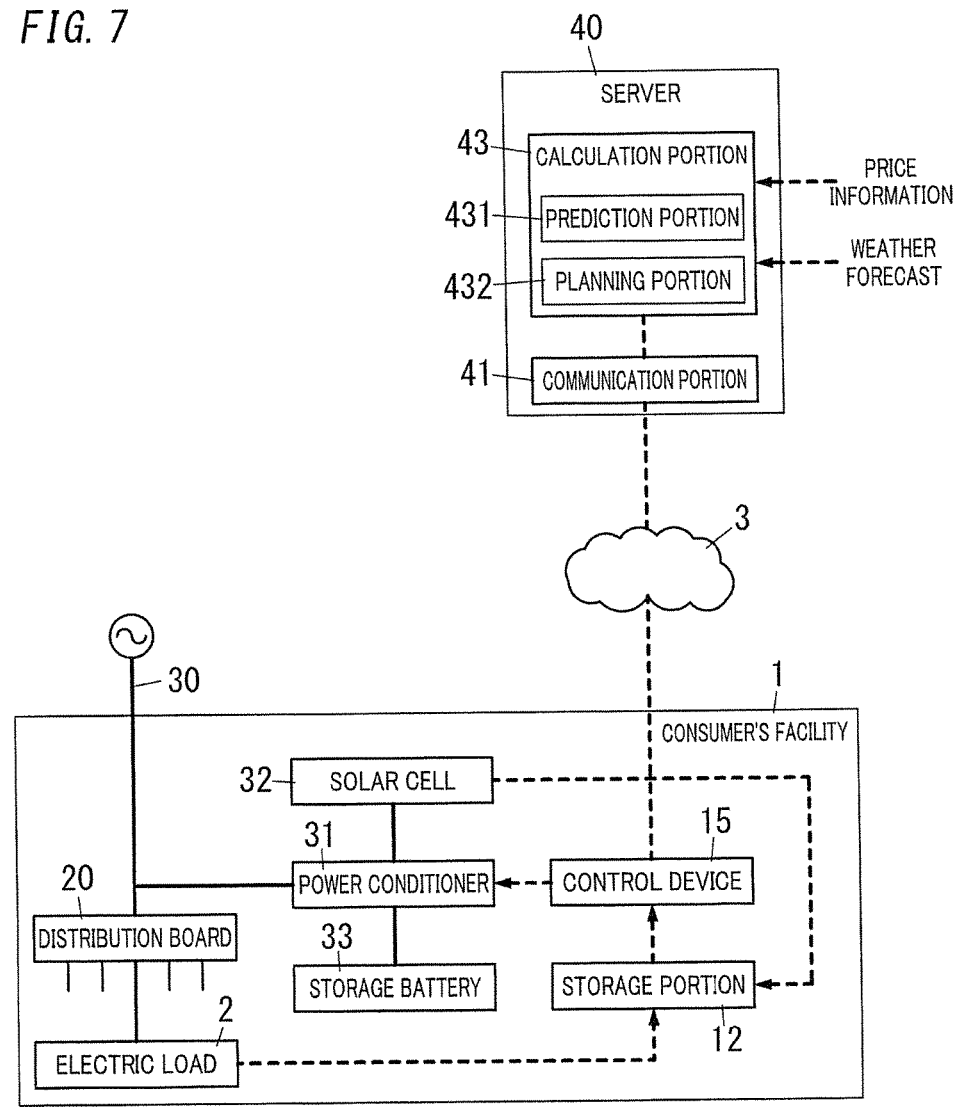
FIG. 7 is a block diagram illustrating yet another exemplary configuration of Embodiments 1 to 3.

Also, in Embodiments 1 to 3 described above, although a consumer's facility 1 includes the power adjustment device 10, a function equivalent to the calculation portion 13 in the power adjustment device 10 may be provided by a server (including a cloud computing system). That is, a consumer's facility 1 is provided with a control device 15 that controls charging of and discharging by the storage battery 33, as shown in FIG. 7. The control device 15 may be incorporated in a HEMS controller, similar to the power adjustment device 10, or may be housed in a housing 34 (refer to FIG. 6) that houses the storage battery 33. The control device 15 can communicate with a server 40 through a telecommunications line 3 such as the Internet. Note that, in FIGS. 6 and 7, solid lines indicate wiring for power, and broken lines indicate paths of a signal or information.

The server 40 can communicate with the control device 15 that controls the power storage apparatus (power conditioner 31) such that power received from the power grid 30 and power of the power storage apparatus (storage battery 33) is supplied to the electric load 2 in the consumer's facility 1. The server 40 includes a prediction portion 431, a planning portion 432, and a communication portion 41. The prediction portion 431 determines the period in which charging of and discharging by the power storage apparatus (storage battery 33) is performed as a planning period, and obtains a prediction value of a demand power that is the power consumed in the electric load 2 in the planning period. The planning portion 432 determines, under a specific condition, a control content of charging and discharging of the power storage apparatus (storage battery 33) in the planning period according to the prediction value of the demand power. Here, the specific condition is that any one of the power amount to be received from the power grid 30, the compensation for power to be received from the power grid 30, and the emission amount of carbon dioxide is minimized. The communication portion 41 is configured to notify the control device 15 of the control content such that the power storage apparatus (power conditioner 31) is caused to operate in accordance with the control content.

The server 40 includes a calculation portion 43 that has a function similar to that of the calculation portion 13. That is, the calculation portion 43 includes: the prediction portion 431 that has a function similar to that of the prediction portion 131; and the planning portion 432 that has a function similar to that of the planning portion 132. The control content determined by the planning portion 432 is transmitted to the control device 15 via the communication portion 41, and the control device 15 controls the charging of and discharging by the storage battery 33 in accordance with the control content received from the planning portion 432.

The invention claimed is:

1. A power adjustment device configured to supply power received from a power grid and power of a power storage apparatus to an electric load in a consumer's facility, the power adjustment device comprising:
    a prediction portion configured to obtain a prediction value of demand power that is power to be consumed in the electric load in a planning period, the planning period being a period in which the power storage apparatus is charged and discharged;
    a planning portion configured to determine a control content of charging of and discharging by the power storage apparatus in the planning period depending on the prediction value of the demand power under a condition that any one of an amount of power to be received from the power grid, a compensation for power to be received from the power grid, and an emission amount of carbon dioxide is minimized;
    a controller configured to control the power storage apparatus in accordance with the control content; and
    a verification portion configured to estimate a prediction error of the prediction value obtained by the prediction portion,
    the planning portion being configured to set the planning period based on:
        a maximum value of the demand power in which the prediction error is considered, and
        a minimum value of generated power that is generated by a solar power generation apparatus installed in the consumer's facility in which the prediction error is considered.

2. The power adjustment device according to claim 1, wherein in a case where two or more unit prices are set for two or more periods as the compensation for power to be received from the power grid, the planning period is set to start at a starting time of a period in which a unit price is the lowest.

3. The power adjustment device according to claim 2, wherein the planning period is set to include two or more periods such that unit prices in the two or more periods, of the two or more unit prices, are respectively different.

4. The power adjustment device according to claim 1, wherein
    the prediction portion is configured to obtain a prediction value of generated power that is power generated by the solar power generation apparatus in the planning period, and
    the planning period is set to include a period in which the prediction value of the generated power is more than a predetermined threshold and a period in which the prediction value of the generated power is less than the predetermined threshold.

5. The power adjustment device according to claim 1, wherein the power storage apparatus can be charged with surplus power that is obtained by subtracting the demand power from generated power that is power generated by the solar power generation apparatus,
    the prediction portion is configured to obtain a prediction value of the generated power in the planning period, and obtain a prediction value of the surplus power from the prediction value of the generated power and the prediction value of the demand power,
    the planning period is set to include a period in which the power storage apparatus can be charged with the surplus power that is predicted, and a period in which the power storage apparatus cannot be charged with the surplus power that is predicted.

6. The power adjustment device according to claim 1, wherein the prediction portion is configured to determine two or more planning periods in which part of one of the two or more planning periods overlaps with part of another of the two or more planning periods, and to obtain a prediction value for each of the two or more planning periods.

7. The power adjustment device according to claim 1, wherein the planning period is set as a period including multiple calculation time periods, each of which serves as a unit period, and
    the planning portion is configured to determine the control content such that the power storage apparatus is charged or discharges for each of the calculation time periods.

8. A power adjustment method for supplying power received from a power grid and power of a power storage apparatus to an electric load in a consumer's facility, the power adjustment method comprising:
    obtaining, with the prediction portion, a prediction value of demand power that is power to be consumed in the electric load in a planning period, the planning period being a period in which the power storage apparatus is charged and discharged;
    determining, with a planning portion, a control content of charging of and discharging by the power storage apparatus in the planning period depending on the prediction value of the demand power under a condition that any one of an amount of power to be received from the power grid, a compensation for power to be received from the power grid, and an emission amount of carbon dioxide is minimized;

controlling, with a controller, the power storage apparatus in accordance with the control content;

estimating, with a verification portion, a prediction error of the prediction value obtained by the prediction portion; and setting, with the planning portion, the planning period based on:
- a maximum value of the demand power in which the prediction error is considered, and
- a minimum value of generated power that is generated by a solar power generation apparatus installed in the consumer's facility in which the prediction error is considered.

9. A power adjustment system comprising:
the power adjustment device according to claim 1; and
the power storage apparatus.

10. A power storage device comprising:
the power adjustment device according to claim 1;
the power storage apparatus; and
a housing that houses the power adjustment device and the power storage apparatus.

11. A server configured to communicate with a control device configured to control a power storage apparatus such that power received from a power grid and power of the power storage apparatus is supplied to an electric load in a consumer's facility, the server comprising:

a prediction portion configured to obtain a prediction value of demand power that is power to be consumed in the electric load in a planning period, the planning period being a period in which the power storage apparatus is charged and discharged;

a planning portion configured to determine a control content of charging of and discharging by the power storage apparatus in the planning period depending on the prediction value of the demand power under a condition that any one of an amount of power to be received from the power grid, a compensation for power to be received from the power grid, and an emission amount of carbon dioxide is minimized;

a communication portion configured to notify the control device of the control content such that the power storage apparatus is caused to operate in accordance with the control content; and a verification portion configured to estimate a prediction error of the prediction value obtained by the prediction portion, the planning portion being configured to set the planning period based on:
- a maximum value of the demand power in which the prediction error is considered, and
- a minimum value of generated power that is generated by a solar power generation apparatus installed in the consumer's facility in which the prediction error is considered.

* * * * *